PUSH-BUTTON CHANNEL SELECTOR FOR A TELEVISION RECEIVER

Filed Sept. 14, 1961 3 Sheets-Sheet 1

INVENTORS:
VAN R. GIBSON, JR.
JULIUS KEMENY,
BY Joseph Levinson
THEIR ATTORNEY.

PUSH-BUTTON CHANNEL SELECTOR FOR A TELEVISION RECEIVER

Filed Sept. 14, 1961

INVENTORS:
VAN R. GIBSON, JR.
JULIUS KEMENY,
BY Joseph Levinson
THEIR ATTORNEY.

INVENTORS:
VAN R. GIBSON, JR.
JULIUS KEMENY,
BY Joseph Levinson
THEIR ATTORNEY.

3,215,920

PUSH-BUTTON CHANNEL SELECTOR FOR A TELEVISION RECEIVER

Van R. Gibson, Jr., North Syracuse, and Julius Kemeny, Liverpool, N.Y., assignors to General Electric Company, a corporation of New York Filed Sept. 14, 1961, Ser. No. 138,137
5 Claims. (Cl. 318—467)

Figure 1:
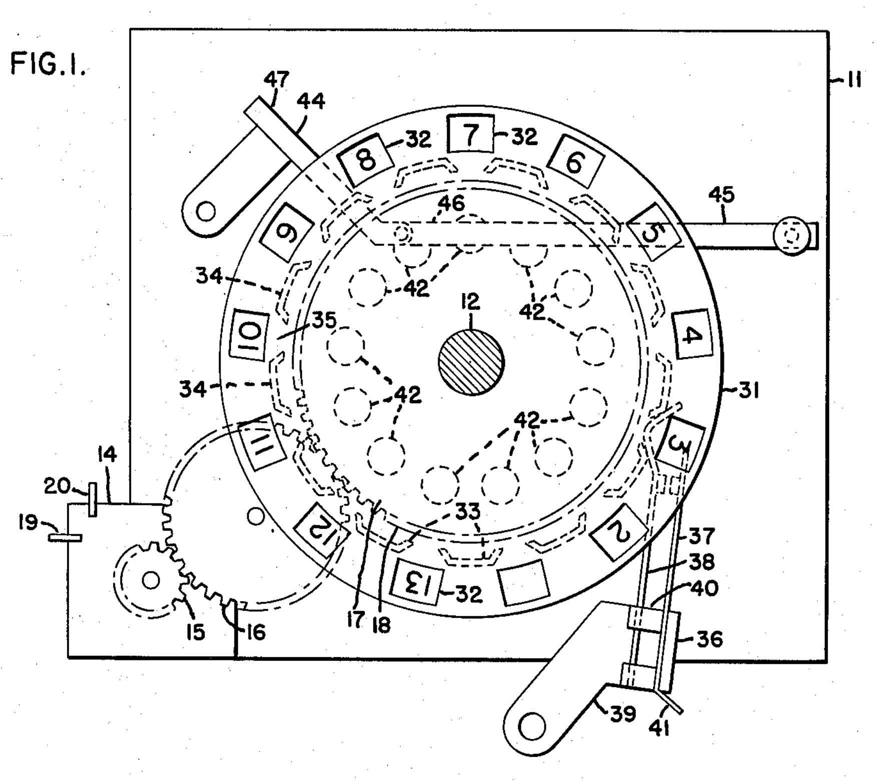

This invention relates to a means for selecting a channel in a television receiver and more particularly to a means for selecting a channel in a television receiver having a power driven tuner.

The use of power driven tuners in television receivers is well known in the art. Receivers utilizing power driven tuners generally include an electric motor and a means mechanically coupling the motor to the tuner mechanism so that when the motor is energized, it rotates the tuner mechanism.

A channel selection operation may be performed by energizing the motor until the tuner is rotated to a desired channel position. In its simplest practical form, channel selection is achieved by momentarily energizing the motor until an electrical detent switch, which is provided, is actuated and supplies power to the motor. The motor then operates to rotate the tuner until the immediate, sequential channel position is reached. At this time, the detent switch and consequently the power to the motor will be interrupted by a means provided to perform the interruption. This cycle may then be repeated until the desired channel is tuned.

Various systems have been provided to momentarily energize the motor and ultimately provide channel selection. One system provides for the energization of the motor by the simple expedient of actuating a switch on a remote transmitter unit. Another system provides a single switch at the receiver for energizing the motor. A further system provides for the use of a combination of these two systems in a single receiver.

Some areas of the United States have relatively few television channels available. It would be tedious for the viewer to repeatedly operate a switch in order to step the tuner from a channel position through intermediate, unused channel tuning positions to a desired channel. In areas where there are a relatively large number of channels available, some viewers establish a strong preference for particular channels. It would similarly be tedious to require the viewer, in this case, to repeatedly operate a switch and step the tuner through not only unused channels, but also through channels which are used but are not desired by the viewer. Accordingly, program systems have been provided by which the viewer may preselect only those channels which he desires to view. Generally, in these program systems, a program switch is provided for energizing the motor when the tuner is not at a preselected channel tuning position. Upon the momentary actuation of a switch in one of the aforementioned channel selection systems which includes this channel pre-selection apparatus, the tuner will step only to a desired programmed channel.

There are occasions when the viewer may desire to tune the receiver to an unprogrammed channel. Such an occasion might occur, for example, when a television program of interest appears on a channel which is not programmed. The viewer must then readjust the programming apparatus to program the channel and further readjust the programming apparatus when he has finished viewing the normally undesired channel. A known alternative is to provide, in addition to the power drive for the tuner, a manual channel selection means such as the well known channel selection knob. This alternative requires in addition to the knob, a tuner shaft extension, an additional hole in the receiver cabinet for the shaft protrusion and a motor energizing circuit interruption switch in order to disable the operation of the program switch when the tuner is manually rotated to an unprogrammed channel position.

Accordingly, it is an object of this invention to provide an improved system of channel selection for a television receiver utilizing a power driven tuner.

Another object of this invention is to provide an improved power tuning system for a television receiver having provision for selection by the viewer of either all of the receiver tuner channels individually or only preselected channels.

It is also an object of this invention to provide an improved power tuning system for a television receiver having provision for selection by the viewer of either all of the receiver tuner channels individually or only preselected channels by either a remote control operation or by the simple expedient of operating a push-button at the receiver.

In accordance with this invention a television receiver having a power driven tuner is provided with a single channel-selection switch mounted at the receiver for selecting alternate means for actuating the power driven tuner.

A preferred embodiments of this invention utilizes, for channel selection by the viewer, a single four-position channel selector switch in conjunction with a motor energizing circuit which includes a detent switch and a program switch. The channel selector switch is positioned on the receiver and its contacts and the motor energizing circuit are interconnected in a manner so that unprogrammed and programmed modes of channel selection are easily available for viewer selection. In the unprogrammed mode of operation, selection of a corresponding channel-selector switch position interrupts the flow of current to the program switch while in the programmed mode, the flow of current in the program switch is not interrupted. Switch means are also included in the channel-selector switch for manually initiating the stepping of the tuner to sequential channel positions or directly to a programmed channel. Control by a remote transmitter may be exerted in either the programmed or unprogrammed mode.

Figure 2:
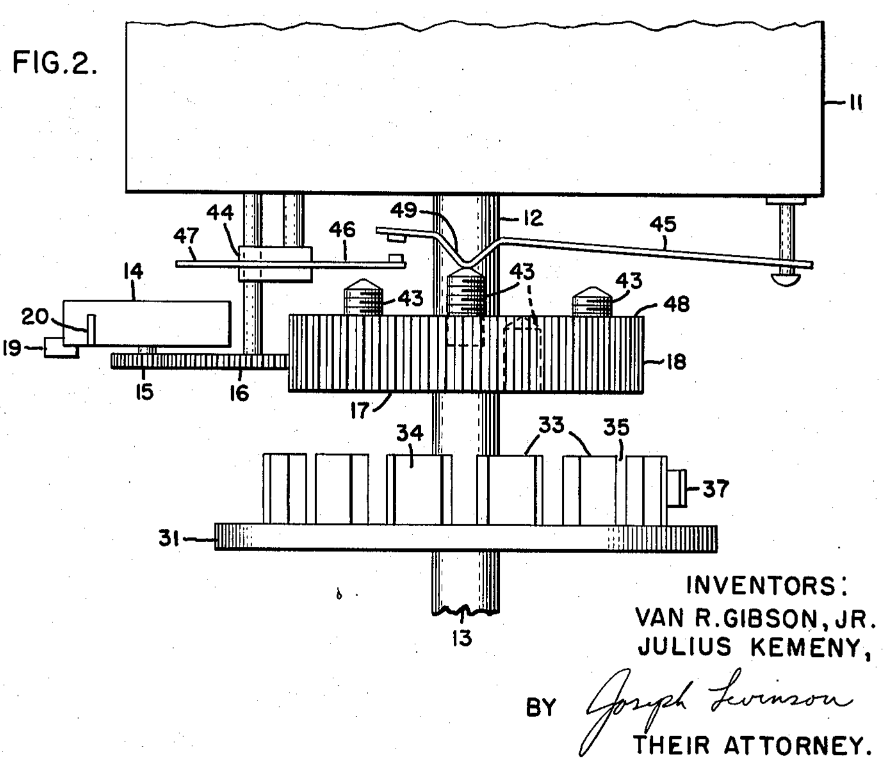
Figure 3:
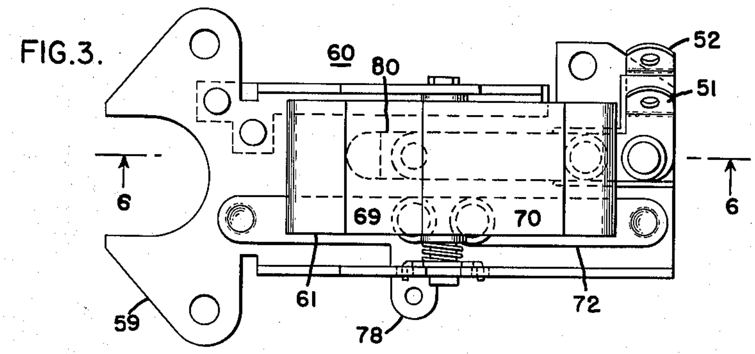
Figure 4:
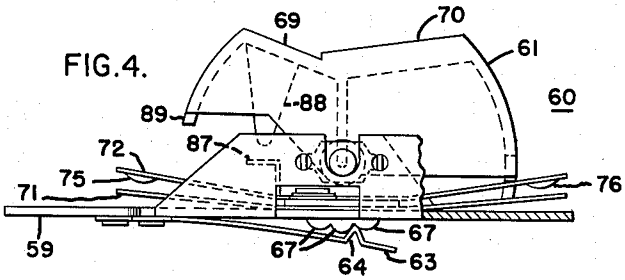
Figures 5, 6, 7:
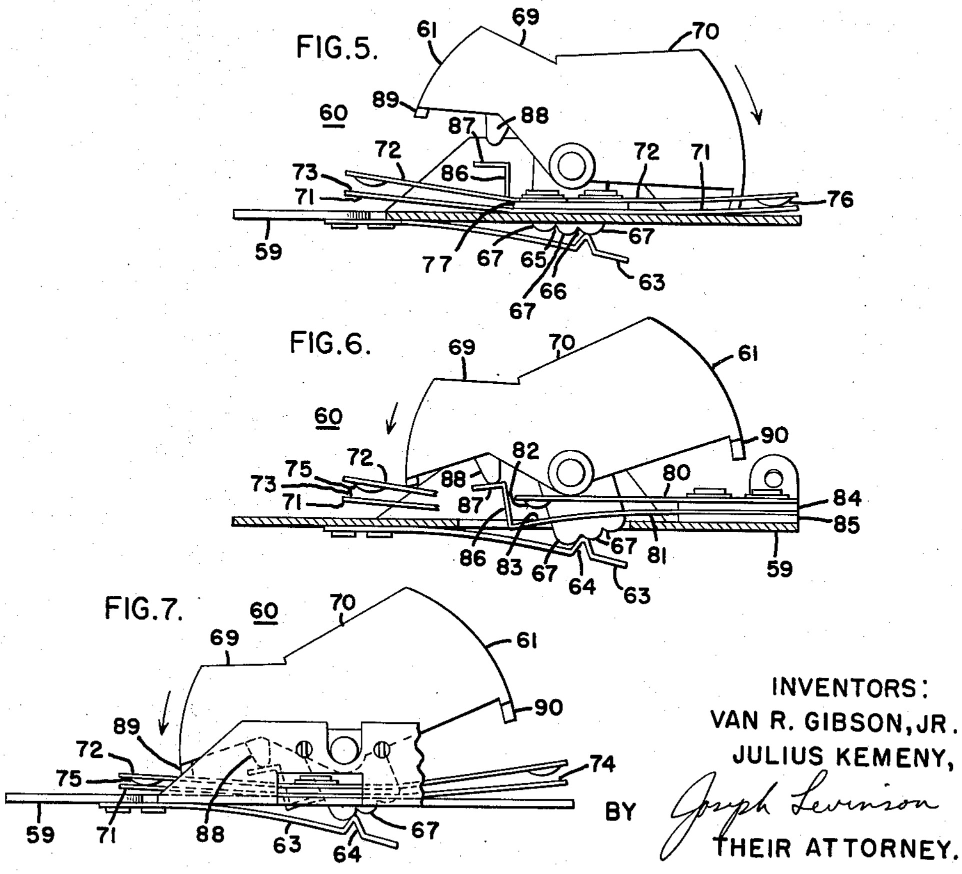
Figures 8, 9:
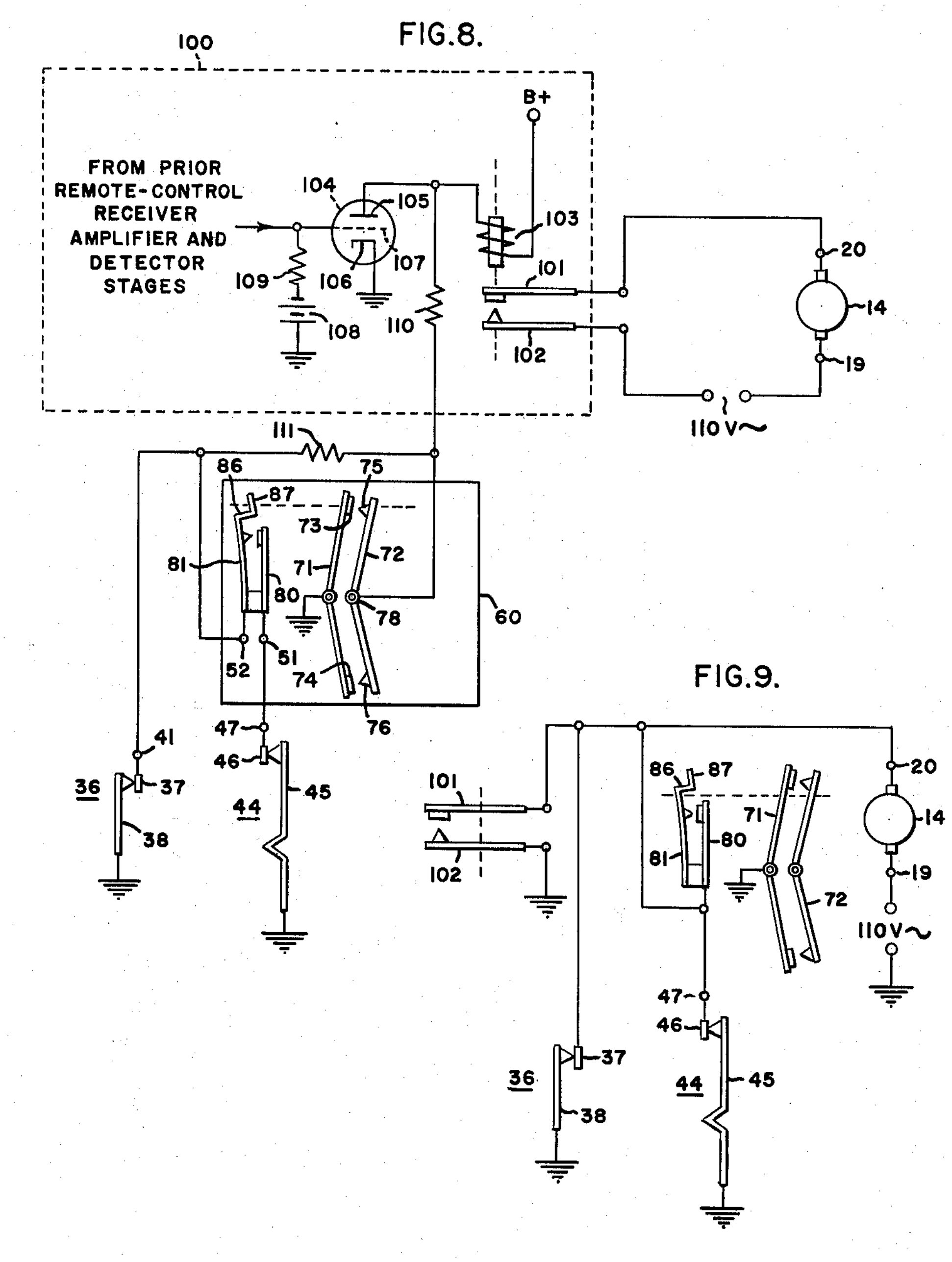

Further objects, features and attending advantages of this invention will be apparent with reference to the following specification and drawings in which:

FIGURE 1 is a front elevation view of the combined driving mechanism and channel preselection mechanism of a power driven tuner utilized in this invention, FIGURE 2 is a plan view of the device of FIGURE 1, FIGURE 3 is a plan view of a four position switch utilized in an embodiment of this invention, FIGURE 4 is an elevation view of the switch of FIGURE 3 with a portion of its mounting bracket cut-away showing the switch in one of its four positions, FIGURE 5 is an elevation view of the switch of FIGURE 3 with a portion of its mounting bracket cut-away showing the switch in another of its four positions, FIGURE 6 is a view of the switch of FIGURE 3 along the section 6—6 showing the switch in another of its four positions, FIGURE 7 is an elevation view of the switch of FIGURE 3 with a portion of its mounting structure cut-away showing the switch in another of its four positions, FIGURE 8 is a schematic diagram of the tuner power drive selection circuit used in the invention, and FIGURE 9 is a schematic diagram of an alternative embodiment of the tuner power drive selection circuit used in the invention.

FIGURES 1 and 2 illustrate only the essential elements of a power driven tuner system necessary for an understanding of this invention. A more detailed description of the power driven mechanism may be found in an application Ser. No. 96,543, filed Mar. 17, 1961, and assigned to the assignee of this invention.

Referring now to FIGURES 1 and 2, a tuner 11 is provided having a drive shaft 12. The tuner 11 is mounted on a structure or bracket, not shown, in a television receiver. One end 13 of the shaft 12 may be mounted on a bearing surface, not shown, attached to a fixed structure, not shown, in the receiver. The alternate end of the shaft 12 is connected to rotatable elements, not shown, in the tuner. When the shaft is rotated to sequential positions, the tuner 11 provides for the tuning of different channels corresponding to the different positions of the shaft. The shaft is rotated by a motor 14 which is coupled to the shaft 12 through the gear linkage comprising a pair of cooperating gears 15 and 16 and a wheel 17 having a geared circumference 18. The wheel 17 is coupled by means, not shown, to the shaft 12. This coupling may be any of a variety of methods known in the art such as a key or a press fit. Electric power is applied to the motor 14 via terminals 19 and 20.

A number wheel 31 is attached to shaft 12 by means not shown and is forced to rotate with the shaft. Wheel 31 has stenciled thereon the numbers, 32, of the twelve television channels to be selected. A thirteenth position is available for a UHF or other desired use. The tuner and driving mechanism are mounted on the television receiver in such a manner that a single channel number will be visible to the viewer when the corresponding channel is being tuned by the tuner. Thirteen equidistant ribs 33 are mounted annularly on the wheel 31. These ribs form a series of peaks 34 and troughs 35 which are best seen in FIGURE 1.

An electrical detent action for the tuner is provided by a detent switch 36 having a stationary contact arm 37 and a flexible arm 38. The switch 36 is mounted on a structure or bracket on the television receiver, not shown, by a metal bracket 39 and is positioned in relation to the ribs 33 so that when a channel is tuned by the tuner 11, the contact arm 38 will sit in a trough 35. The flexible arm 38 is constructed of a resilient metal and is biased against the ribs 33 in a manner so that the rotation of the wheel 31 will cause the contact arms 37 and 38 to break and make contact when arm 38 contacts a trough 35 and rib peak 34 respectively. The contact arms 37 and 38 are insulated from one another by suitable insulating material 40. Arm 38 is electrically connected to the bracket 39 and is therefore at chassis or ground potential. Electrical contact may be made with arm 37 via terminal 41 connected to arm 37. The detent switch is generally connected in a motor energizing circuit so that voltage is applied to the motor through the detent switch when arms 37 and 38 make contact. Electrical detent action is well known in the art and need not be further considered here.

The wheel 17 has thirteen annularly arranged and equidistant circular tapped holes 42. A tuning screw 43 may be mounted in each hole 42. By means of a fine tuning adjustment mechanism described in the aforementioned pending application, these screws may be adjusted to pre-select a desired channel. FIGURE 2 shows several fine tuning screws 43. Three screws are extended and adjusted for selecting and tuning channels corresponding to the screw positions of the extended screws. The other screw is completely recessed in wheel 17 and corresponds to an unselected channel position.

A program switch 44 having contact arms 45 and 46 is mounted on the tuner 11 in a position relative to the screws 43. Arm 45 is electrically connected to the tuner 11 and is therefore at chassis or ground potential. Arm 46 is insulated from the tuner and has a terminal 47. As described in the aforementioned pending application, when a screw is adjusted to fine tune the receiver, the screw protrudes from the surface 48 of wheel 17 at least a distance sufficient to contact a rib 49 on switch contact

45 and force the contact arms 45 and 46 to separate. The relative positions of the wheel 17 and the switch 44 is arranged so that a screw 43 operates contact arm 45 only when a channel is fine tuned. The corresponding screws for channels not utilized may be recessed within the wheel 17 thereby having no operative effect on a program switch when the unused channel is selected. This aspect of "programming" channels to be used is described in the aforementioned pending application and need not be further considered here.

Referring now to FIGURES 3. 4, 5, 6 and 7, a single push-button four position switch 60 is shown. The switch includes a mounting bracket 59, an actuator 61 pivotally mounted on the bracket 59, a detent spring 63 for biasing the actuator, and a contact assembly to be described in more detail hereinafter. The detent spring 63 is attached to the mounting bracket and selectively biases the actuator in either of two switch positions intermediate two extreme unbiased switch positions. FIGURES 6 and 4 show the actuator in intermediate first and second biased positions respectively while FIGURES 7 and 5 show the actuator in the extreme first and second unbiased positions respectively. The bias force of the detent spring is applied to the actuator 61 by a rib 64 on the spring 63 and rib which sits in either of two troughs 65 or 66 on actuator 61 formed by the lobes 67.

By exerting a force on surface 69 of actuator 61 the switch may be stepped from the second biased position as shown in FIGURE 4 to the first biased position shown in FIGURE 6 and to the first unbiased extreme position shown in FIGURE 7. By exerting a force on surface 70 of actuator 61, the switch may be stepped from the first biased position shown in FIGURE 6 to the second biased position of FIGURE 4 and finally to the second unbiased position of FIGURE 5.

The contact assembly comprises two pair of contact arms. A first pair, best seen in FIGURE 5, includes contact arms 71 and 72 having contact surfaces 73, 74, 75 and 76 at their respective ends, best seen in FIGURES 5, 7 and 4. Contact arm 71 makes electrical and mechanical contact with the mounting bracket 59. Contact arm 72 is made of a resilient metal and is bow shaped so as to be biased apart from the contact surfaces of contact arm 71 in the biased positions of the switch. Contact arms 71 and 72 are insulated from each other by an insulating strip 77 comprising any suitable insulating material. A terminal 78, shown in FIGURE 3, is connected to contact arm 72. The assembly of contact arms 71 and 72, and insulating strip 77 are riveted to the bracket 59 in a manner so that the contact 72 remains insulated from the bracket.

The other pair of contact arms, best seen in FIGURE 6, includes contact arms 80 and 81 having contact surfaces 82 and 83 respectively. Contact arms 80 and 81 are insulated from the bracket 64 and from each other by insulating strips 84 and 85 respectively. Contact arm 81 has a flange 86 and a lip 87 at one end and is positioned relative to arm 88 of actuator 61 in a manner so that it may be acted upon by arm 88 of actuator 61. The contact arm 81 is made of a resilient metal and is biased so that its contact surface 83 is normally in contact with the contact surface 82 of contact arm 80 when arm 88 is not operating on arm 81. Contact arms 80 and 81 are connected to terminals 51 and 52 respectively.

The operation of the switch 60 will now be explained. When the first biased position shown in FIGURE 6 is selected, the contact arms 71 and 72 will be biased apart and the contact arms 80 and 81 are forced apart by the action of arm 88 of actuator 61 on the lip 87. In this position no continuous circuit exists through the switch. When the first unbiased position shown in FIGURE 7 is selected, contact arms 80 and 81 are further forced apart by arm 88 of actuator 61 while contact surfaces 73 and 75 of arms 71 and 72 are forced into contact by the force of ridge 89 of actuator 61 on contact arm 72. This action connects arm 72 through contacts 75 and 73 and arm 71 to the potential of the mounting bracket 59. When the second biased position of FIGURE 4 is selected, the arm 88 of the actuator 61 is raised off the lip 87 of contact arm 81 and only the contact surfaces 82 and 83 of contact arms 80 and 81 respectively make contact. When the second unbiased position of FIGURE 5 is selected, contact surfaces 82 and 83 of contact arms 80 and 81 remain in contact and in addition the ridge 90 of actuator 61 forces contact arms 71 and 72 together at contact surfaces 74 and 76. This connects contact arm 72 to the bracket 64 which is at chassis or ground potential. It is apparent that in order to maintain contact when the actuator is in one of the unbiased positions, an actuating force must be maintained on the actuator surfaces 69 or 70. Thus, a relatively simple and inexpensive switch having four positions has been described.

Referring now to FIGURE 8, a switching circuit for coupling power to the tuner drive motor 14 is shown including a pair of relay contact arms 101 and 102, connected serially with a source of 110 volt alternating supply voltage and the terminals 19 and 20 of tuner drive motor 14. When relay contact arms 101 and 102 are closed, the 110 volt supply voltage energizes the motor and forces the tuner to rotate. Relay contact arms 101 and 102 make contact only when a current at least equal to the pull-in current of the relay flows through relay coil 103. In accordance with a feature of this invention, soon as the amplitude of current reaches the pull-in value, arms 101 and 102 make contact, and a current of a lesser amplitude but at least equal to the hold-in value of current for the relay maintain arms 101 and 102 in contact.

The required pull-in current is provided by two different control sources. A first control source includes the remote receiver control triode 104. Pull-in current flows from B+, through relay coil 103 and through the anode 105 to cathode 106 path of triode 104 to ground. A bias potential is provided for a control grid 107 of triode 104 by a battery 108 and a resistor 109. In the absence of a control signal at the grid 107, the bias established by the battery 108 limits the amount of anode current flowing in triode 104 to a value below the value of relay hold-in current. When a remote-control transmitter, not shown, generates a channel select command signal, the signal is received, amplified and detected by remote control receiver circuits, not shown. A signal from the last stage in these circuits is applied to the control electrode 107 of triode 104. This signal raises the voltage at grid 107 to a level sufficient to allow the flow of pull-in current in triode 104. Relay arms 101 and 102 close and energize motor 14 thereby initiating rotation of the tuner to the next channel position.

A mechanical switching arrangement is provided and coupled to the relay coil for providing a flow of current in the relay coil. This feature is described and claimed in copending application Serial No. 138,130 filed Sept. 14, 1961, and assigned to the assignee of the present application. The signal at the control electrode 107 is at least of sufficient duration to allow the tuner to rotate a distance sufficient to force the arm 38 of detent switch 36 out of a trough 35 and onto a peak 34 formed by the ribs 33 on wheel 31 of FIGURE 1. This action places the relay coil 103, resistors 110 and 111, and the detent switch contacts 37 and 38 in series between B+ and ground potential and provides a path for hold-in current. The sum of the values of resistance of resistors 110 and 111 is small enough to allow the flow of hold-in current but too large to allow the value of pull-in current to flow. Thus, the relay arms are held in contact by the flow of this hold-in current.

Current continues to flow through triode 104 as long as the signal at grid 107 is present. However, means are generally provided to terminate this signal before the next trough on the wheel 31 is rotated into position to interrupt contact arms 37 and 38 of detent switch 36. In this manner then, only hold-in current through the detent switch is flowing when arms 37 and 38 are separated by a rotation of the wheel 31.

The second control source for providing a pull-in current includes the arms 71 and 72 of switch 60. When the first unbiased position of switch 60 is selected, contact arms 71 and 72 make contact through contacts 73 and 75 and pull-in current flows from B+, through relay coil 103, resistor 110 and contact arms 72 and 71 to ground potential. The resistor 110 has a value chosen so that in the above described current path, pull-in current flows. The motor is thus energized and the tuner driven thereby. When contact between arms 71 and 72 is broken, hold-in current flows through detent switch 36 and allows rotation of the tuner to the next trough on wheel 31 in a manner previously described. If arms 71 and 72 are held continuously in contact, the tuner continuously rotates until contact between these arms is broken and the trough next in position following the break in contact is reached.

Thus far, it has been assumed that only the first biased and unbiased positions have been selected and only the operation of the circuit of FIGURE 8 with regard to unprogrammed selection of channels has been described. When contact arms 80 and 81 of switch 60 are in contact, a hold-in current path, alternate to the path provided by the detent switch, is provided. This path comprises the series connection of program switch 45 and the contact arms 80 and 81 of switch 60. When the viewer selects either the second biased or unbiased positions on switch 60, force of arm 81 of actuator 61 is removed from the lip 87 on contact arm 81, contact arms 80 and 81 are closed, and the receiver is in a programmed mode. When a remote control channel-select signal is received, a pull-in current is thereby provided in the manner previously described for the unprogrammed mode. However, in this mode, hold-in current flows through both the detent switch 36 and the series connection of contacts 80 and 81 of switch 60 and program switch 45. When the immediate sequential channel tuning position is reached, arms 37 and 38 of detent switch 36 separate. However, unless the immediate sequential channel is a preselected channel, hold-in current continues to flow through arms 80 and 81 of switch 60 and program switch 44, and the tuner continues to rotate until a preselected channel is reached. When a preselected channel is reached, the control arms 45 and 46 of program switch 44 are separated by the tuning screw 43, the flow of hold-in current is interrupted, and the tuner rotation is stopped at the preselected channel position.

Push button selection of a programmed channel is provided at the receiver when the second unbiased position is selected. Upon selection of this switch position, contact arms 71 and 72 make contact through contacts 74 and 76. Pull-in current flows, as hereinbefore described, from B+, through coil 103, resistor 110 and arms 72 and 71 to ground potential. Upon separation of contacts 74 and 76 hold-in current flows, and the tuner rotates to a preselected channel as previously described.

Although the combination of detent switch, program switch, and channel selection switch has been described and illustrated as being utilized for energizing the motor circuit through the energization of a relay coil 103, it will be obvious to those skilled in the art that by the selection of switches of suitable capacity and by providing suitable insulation, the above described switching operation might be performed in the motor circuit itself.

FIGURE 9 is an alternative arrangement of the invention in which a 110 volt alternating voltage supply is shown connected between terminal 19 of motor 14 and ground potential. The operation of this circuit is substantially similar to the circuit of FIGURE 8 with the exceptions that the detent switch 36, the program switch 44 and the switch contacts 80 and 81 connect an alternating voltage directly across the motor 14. The current which flows through the switches is the current drawn by the motor rather than the relay coil pull-in and hold-in values of current described with relation to FIGURE 8. Remote control operation for initiating channel selection is the same as described with relation to FIGURE 8.

Thus it has been shown how a viewer may select an immediately sequential channel position on the tuner by momentarily selecting a first unbiased position on the channel selection switch 60 or he may step the tuner continuously through sequential channels by continuously actuating this switch position. By selecting a first biased switch position, and upon receipt of remote command signals the tuner may be stepped to immediately sequential channel tuning positions. The receiver may be placed in a programmed operation mode by selection of second biased or unbiased positions. The viewer may initiate selection of a programmed channel by momentary selection of the second unbiased position. Finally, through selection of the second biased position and concurrent receipt of a remote command signal, the tuner may be stepped directly to a preselected channel.

In all of the above mentioned modes of operation, the viewer may remain informed of the channel position then tuned through the visual indication afforded by the aforementioned number plate.

While we have illustrated, described and pointed out in the annexed claims certain novel feautres of our invention, it will be understood that various omissions, substitutions and changes in the forms and details of the system illustrated may be made by those skilled in the art without departing from the spirit of the invention and scope of the claims.

What we claim as new and desire to secure by Letters Patent of the United States is:

1. A system for tuning a television receiver to a desired signal channel comprising a tuner having sequentially arranged channel tuning positions, a motor mechanically coupled to said tuner for stepping the tuner to sequential channel tuning positions, a source of electric power for said motor, a pair of relay contacts for connecting said source of electric power to said motor, a relay coil having two terminals and positioned relative to said relay contacts for actuating said relay contacts and a circuit for energizing said relay coil including a source of direct current voltage, a first pair of contacts, a second pair of contacts, means connecting said source of direct current voltage to a first terminal of said relay coil, a first resistor interconnecting the second terminal of said relay coil and a first one of the contacts of said first pair of contacts, a second resistor interconnecting said first one of the contacts of said first pair of contacts and a first one of the contacts of said second pair of contacts, and means connecting the second contacts of said first and second pair of contacts to said source of direct current voltage.

2. The apparatus of claim 1 wherein said first resistor having a value of resistance chosen so that relay coil pull-in current flows in said relay coil when said first pair of contacts close and said second resistor having a value of resistance chosen so that relay coil hold-in current flows in said relay coil when only said second pair of contacts close.

3. A system for tuning a television receiver to a desired signal channel comprising a tuner having sequentially arranged channel tuning positions, means for preselecting channels to be tuned, a motor mechanically coupled to said tuner for stepping the tuner to sequential channel tuning positions, a source of electric power for said motor, a pair of relay contacts for connecting said source of electric power to said motor, a relay coil having two terminals and positioned relative to said relay contacts for actuating said relay contacts and a circuit for energizing said relay coil including a source of direct current voltage, a detent switch having a pair of contacts, a program switch having a pair of contacts, a pair of program defeat contacts, a pair of switch contacts of momentarily or continuously energizing said relay coil, an amplifying device having a control element, means connecting said source of direct current voltage to a first terminal of said relay coil, means for applying a remote control receiver signal to said control element, means connecting said amplifying device between said second terminal of said relay and said source of direct current voltage in a manner so that pull-in current will flow in said relay coil when a remote control signal is received by said receiver, a resistor interconnecting the second terminal of said relay coil and a first one of said pair of switch contacts, means connecting a first one of said pair of program switch contacts to a first one of said pair of program defeat contacts, means connecting a first one of said pair of detent switch contacts to the second one of said pair of program switch contacts, a resistor interconnecting said second one of said pair of program switch contacts and said first one of said pair of switch contacts, and means connecting a second one of said pair of detent switch contacts, a second one of said pair of program defeat contacts and a second one of said pair of switch contacts to said source of direct current voltage.

4. A system for tuning a television receiver to a desired signal channel comprising a tuner having sequentially arranged channel tuning positions, a motor mechanically coupled to said tuner for stepping the tuner to sequential channel tuning positions, a source of electric power for said motor and a motor energizing circuit for coupling said source of power to said motor, said motor energizing circuit including a channel selection switch having an electrical contact actuator mounted to be visible and operable by a viewer, said switch including means for positioning said actuator in first and second unbiased positions and for securing said actuator in first and second biased positions.

5. A system for tuning a television receiver to a desired signal channel comprising a tuner having sequentially arranged channel tuning positions, means for preselecting channels to be tuned, a motor mechanically coupled to said tuner for stepping the tuner through positions intermediate said channel tuning positions to succeeding channel tuning positions, a source of electric power for said motor, a motor energizing circuit including a detent switch, a program switch, and a single channel selection switch mounted on said receiver and having first and second biased positions and first and second unbiased positions, said channel selection switch including a pivotally mounted actuator, a detent spring positioned relative to said actuator for biasing said actuator selectably in first and second bias positions, a first pair of contact arms mutually insulated, a second pair of contact arms mutually insulated, said first and second pair of contact arms positioned relative to said actuator in a manner so that when said switch is in said first unbiased position said first pair of contact arms are in contact, when said switch is in said second biased position said second pair of contact arms are in contact, and when said switch is in said second unbiased position, said first pair of contact arms are in electrical contact and said second pair of contact arms are in electrical contact, means connecting said program switch in series with said second pair of contacts, means connecting in parallel said series connection of the program switch and the second pair of contacts with said detent switch, and with said first pair of contacts.

References Cited by the Examiner

UNITED STATES PATENTS

| | | | |
|---|---|---|---|
| 2,812,486 | 11/57 | Foster | 318—467 |
| 2,897,354 | 7/59 | Bourget et al. | 318—16 XR |

ORIS L. RADER, *Primary Examiner.*